Patented Nov. 22, 1932

1,888,491

UNITED STATES PATENT OFFICE

ROYSEL J. COWAN, OF TOLEDO, OHIO, ASSIGNOR TO SURFACE COMBUSTION CORPORATION, OF TOLEDO, OHIO, A CORPORATION OF NEW YORK

PROCESS OF CASE HARDENING METALS

No Drawing.   Application filed October 27, 1930.   Serial No. 491,640.

This invention relates to improvements in the art of case-hardening steel with ammonia and has for its object to provide a process of case-hardening or nitriding that shall produce a superior case in less time than has heretofore been attainable.

In intermittent or batch-type processes of nitriding as ordinarily conducted, the ammonia is caused to flow through the heating chamber or container wherein the metal is contained at such a rate that ammonia dissociation will not be in excess of 30 to 40% at any time during the heating period, which period runs from 24 to 90 hours, depending on the depth of case required. In other words in intermittent processes as heretofore conducted, it is necessary to draw off ammonia at such a rate that only about 35% of it is dissociated in order to obtain proper nitriding. The reason for this is that hydrogen as well as nitrogen is liberated when ammonia breaks up, and if more hydrogen than that represented by 35% dissociation is present in the gaseous mixture, it has a decarburizing effect on the metal being treated. Decarburization prevents the best nitriding results. Moreover, in order to get the best and hardest cases by this type of process, the gases must be thoroughly agitated in order to sweep away from reacting surfaces any high concentration of hydrogen. The reason for agitation is not so much to bring ammonia into contact with the work as it is to keep hydrogen away from new metal surfaces.

I have discovered that as good or better case can be obtained in much shorter time, namely in from 12 to 16 hours, provided that during the period the metal is absorbing heat following its introduction into the heating chamber, the ammonia is supplied at such rate and in such amounts that practically pure ammonia is present in the heating chamber during substantially the entire preliminary heating period. Following this initial treatment of the metal, or in other words from and after the time the metal has attained a substantially constant temperature, it is immaterial how much ammonia dissociation takes place. Consequently the amount of ammonia supplied to the chamber may be, and preferably is, so reduced that substantially complete ammonia dissociation takes place, it being permissible in accordance with the present invention, and hence desirable on account of reduced ammonia consumption, to reduce the flow of ammonia to such extent that ammonia dissociation is practically complete. In other words, following the initial treatment which requires ammonia in such amounts that the percentage of ammonia dissociation is held to a minimum, it is permissible to reduce the amount of ammonia supply to such extent that a high percentage of ammonia dissociation will result, it being immaterial whether the ammonia dissociation is as low as 50% or as high as 90%.

From the foregoing it will be seen that the present invention differs from ordinary batch-type nitriding processes primarily in that during the time the metal is absorbing heat, there is passed through the heating chamber such amounts of ammonia as will suffice to hold ammonia dissociation to a minimum and that after the metal is up to temperature the amount of ammonia supplied may be such that substantially complete dissociation of the ammonia will result.

From the foregoing it will be seen that by the present process, the new metal surfaces can come in contact only with full strength ammonia which exerts its full nitriding power on the metal at a time when it is most susceptible to its action and without any retardation from excessive hydrogen decarburization.

The invention is relatively simple but marks a decided improvement in the art since not only is the time required for casehardening operation materially reduced, but what is equally important, the case obtained is just as good, and in fact, is superior to that obtained with prior nitriding processes.

What I claim is:

The process of case-hardening metal with ammonia which comprises heating the metal in a closed heating chamber, supplying to such chamber while the metal is absorbing heat, such amounts of ammonia as will result in maintaining the percentage of ammonia dissociation to a minimum and after absorption of heat by the metal is complete, reducing the ammonia supply to such extent that substantially complete ammonia dissociation will result.

In testimony whereof I affix my signature.

ROYSEL J. COWAN.